Figure 1:
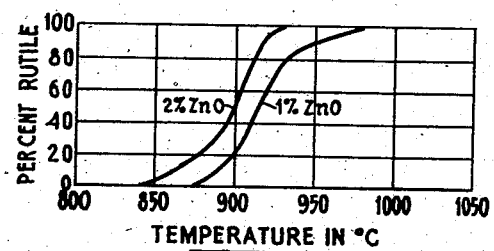

James E. Booge INVENTOR
BY John P. Hancock ATTORNEY

Patented Aug. 26, 1941

2,253,551

UNITED STATES PATENT OFFICE 2,253,551

TITANIUM PIGMENT PRODUCTION

James Eliot Booge, Wilmington, Del., assignor to E. I. du Pont de Nemours & Company, Wilmington, Del., a corporation of Delaware Application June 22, 1938, Serial No. 215,220

17 Claims. (Cl. 106—296)

This invention relates to improved titanium dioxide pigments having exceptionally high durability characteristics and to novel methods for producing the same. More particularly, it concerns the production of improved, white titanium dioxide pigments with which, preferably, small amounts of zinc titanate crystals are intimately associated. More specifically, the invention provides for the production of a titanium dioxide pigment in substantially rutile crystalline modification intimately combined and associated with relatively small amounts of zinc titanate crystals said pigment being in such physical and chemical state as to exhibit excellent durability characteristics after prolonged exposure to the outdoor elements and relatively complete freedom from the tendency towards chalking or fading failures which prior titanium dioxide pigments characteristically exhibit.

The ideal and commercially adaptable titanium dioxide pigment to be useful in both interior and exterior coating applications must not only retain such valuable pigmentary properties as inertness, color, brightness and hiding power, but must also impart desired tint retention to the coating and be free from any tendency to chalk or fade. Titanium dioxide occurs in three crystalline forms, i. e., anatase, brookite and rutile, having respective refractive indices of 2.52, 2.64 and 2.71. Previous commercial titanium dioxide pigments are characterized by the anatase crystalline structure, which, as will be noted, is the form of lowest refractive index. These prior anatase form of $TiO_2$ pigments are characteristically porous in structure, very fine in particle size, and extremely irregular of surface. They chalk and fade badly and with extreme rapidity, particularly when employed in exterior applications subjected to atmospheric or other deteriorating influence. Thus, when such pigments are formulated in linseed oil paints of high covering power and exposed to the elements, disintegration of the paint film begins to occur within a very short period of time, and is manifested by the appearance of numerous particles of loosely-held pigment on the surface of the film, characterized as "chalking" in the art. If the white pigment has been tinted to a color by means of a colored pigment, or to gray by means of lamp black, the chalk particles of white pigment on the surface of the tinted paint film obscure the color of the underlying surface and the paint then presents a blotchy, unsightly appearance, some areas have "faded" or lost the original color to become "white." As a consequence, titanium dioxide pigment use is seriously limited in paints and coating compositions, and especially in those designed to cover surfaces, either for protection or ornamentation, which require outdoor exposures.

Various attempts have been made previously to obtain pigments adaptable for both interior and exterior applications from anatase titanium dioxide, or through conversion of the same to rutile. None, however, has proved successful or adapted to the production of a product satisfactorily suited for the intended pigment use. Thus, for example, U. S. Patent 1,348,129 proposes to convert titanium dioxide to rutile modification by calcining precipitated titanium dioxide at temperatures of 900 to 1000° C., in the presence of a volatile halogen compound such as zinc chloride; U. S. Patent 1,436,164 proposes to produce pigment titanates in crystal modification containing titanium dioxide and an insoluble salt of a bivalent metal, by mixing together and subsequently heating equivalent amounts of precipitated titanic acid and a bivalent metal compound; U. S. Patent 1,590,697 proposes the manufacture of titanium zinc compounds by a dry process by heating in molecular proportions mixtures of $TiS_2$ and zinc sulfate; while U. S. Patent 1,750,287 proposes to neutralize precipitated titanium dioxide by use of an excess of zinc oxide, filter, wash and then heat the resultant product to incandescence. Due to the conversion or other conditions which prevail in such processes, the product therefrom is either of very unsatisfactory color, exhibits objectionable chalking and fading failures when employed in exterior coating applications, or does not possess that complete and desired combination of essential pigmentary properties requisite to a titanium dioxide pigment which will be adaptable to all manners and types of commercial usage.

It is among the objects of this invention, therefore, to overcome the lack of essential pigmentary properties which the pigments from prior titanium dioxide processes characteristically exhibit, and to provide a novel and improved type of titanium pigment and process for producing the same which will exhibit all of the essential pigmentary attributes which have been alluded to. A further object of the invention includes the production of a white titanium pigment of markedly improved, superior durability characteristics, and one which exhibits relatively complete freedom from any tendency towards chalking or fading, particularly when employed in coating formulations subjected to outdoor exposure and the elements. A further object of the invention includes the production of an improved titanium dioxide pigment of substantially rutile crystalline modification, and containing relatively small amounts of zinc in the form of a titanate. An additional object includes the production of an improved type of titanium pigment which is of characteristically uniform, relatively large, coarse particle size; of satisfactory and improved color, having high tinting strength and hiding power values, and possessed of other desirable pigmentary properties, such as essential and satisfactory oil absorption, brightness, inertness, etc., value.

In accordance with the present invention and discovery, it has been found that if either anatase or rutile titanium dioxide is subjected to calcination in the presence of regulated and preferably minor amounts of a compound of zinc which is non-volatile under the prevailing calcination conditions, quite unexpectedly, a novel and superior type of pigment of markedly improved stability and durability characteristics results; and that when said pigment is subsequently employed in coating compositions, it will possess the desirable qualities of relatively complete freedom from any tendency towards chalking, lack of tint retention, and/or fading.

Further, it has been found that when anatase titanium dioxide is employed in the production of such novel pigments and preliminarily calcined to first develop desired pigment properties such as tinting strength, hiding power, color, oil absorption, etc. (but under such conditions as will inhibit transformation of the anatase to rutile), recalcination of the product in the presence of relatively small or minor quantities of a compound of zinc which is non-volatile under the recalcination conditions or which converts to zinc oxide during calcination will effect conversion of the anatase to rutile crystalline state and produce an exceedingly durable titanium dioxide-zinc titanate pigment which will be relatively free from any tendency towards chalking, lack of tint retention, or fading, when subsequently employed in exterior coating compositions.

Figure 2:
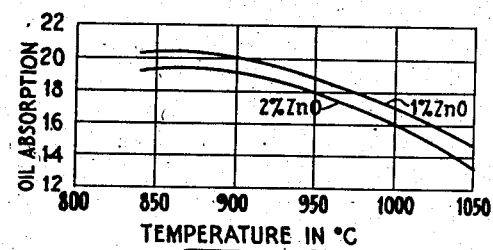
Figure 3:
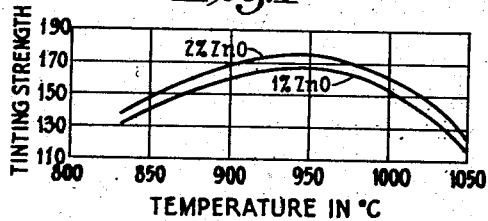
Figure 4:
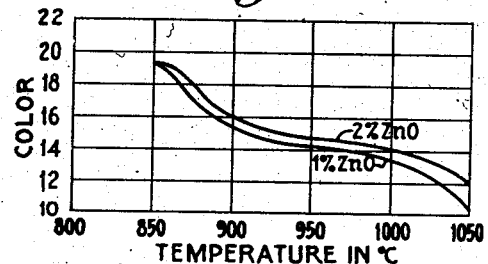
Figure 5:
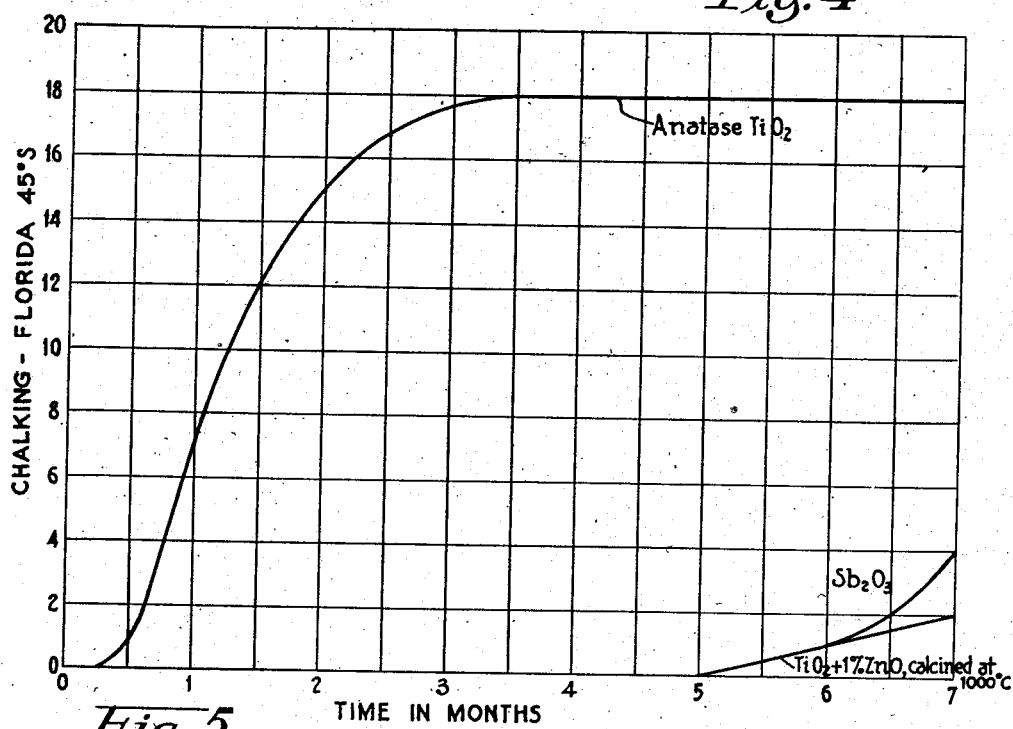

Referring to the accompanying illustrative drawing, Figure 1 thereof shows a plurality of curves, the abscissa representing pigment calcination temperatures and the ordinates values for color, oil absorption, tinting strength and percentage rutile conversion, when varying pigment calcination temperatures with either 1% or 2% zinc oxide are employed in the invention; while Figure 2 comprises a set of comparative curves on chalking determinations resulting from concurrent exposure of standard automotive finish coated panels at 45° south Florida sunshine for a period of seven months' time, the $TiO_2$ pigment ingredient in said finishes being either prior art anatase $TiO_2$, an admixture of prior anatase $TiO_2$ with antimony oxide, or rutile converted $TiO_2$ containing small amounts of zinc titanate crystals, as contemplated in the instant invention.

Having broadly referred to the underlying principles of the invention, a brief description of the pigmentary terms employed to describe the novel pigments of this invention, together with methods employed for determining the same, will now be set forth, in order that a more complete understanding of the invention will be had.

Durability

For purposes of the present invention, durability may be described as the resistance which a pigment exhibits towards fading and chalking when tested in paints employed in exterior exposures and automotive finishes.

In determining the durability and non-fading or non-chalking characteristics of the pigments of the present invention, an outside house paint formulation was selected, consisting of a linseed oil vehicle containing 92% acid refined linseed oil and 8% of bodied linseed oil. Pigmentation was at 28.5% pigment volume and the titanium pigment made up 24.4% of the weight of the pigment. A 35% leaded zinc oxide and fibrous magnesium silicate (36.6% of the former and 39% of the latter) made up the remainder of the white pigment portion of the paint. The paints were ground on a three-roll paint mill at optimum paint grinding consistency and later thinned with the remainder of the oil and the proper amount of mineral spirits. Tinting to standard gray and buff tints was made with the proper paste colors and were exposed along with the whites.

Exposure tests of these paints were made on edge grained white pine panels. Three coats of paint were applied to each panel, using a standard recommended reduction for first and second coats (½ pint turpentine plus 1 pint of raw linseed oil for the first coat, and 1 pint of turpentine plus ½ pint of linseed oil for the second coat). The third coat was applied unreduced. These panels were exposed for direct comparison with similar panels containing standard titanium dioxide, extensively employed in the industry, on both vertical and 45° inclined Delaware fences facing south and also on 45° south Florida fences.

Determination of the durability characteristics of the pigments of the present invention in automotive finishes was also made, and in direct comparison with standard $Sb_2O_3$-$TiO_2$ pigments employed in such finishes. The pigments were formulated in an automotive finish of the well known polyhydric alcohol-polybasic acid type, the formulation comprising 23% pigment, 31% of a dry oil modified polyhydric alcohol-polybasic acid resin, and 46% solvent. The enamels were prepared by grinding in pebble mills followed by addition of 0.07% cobalt drier as metal, tinting to the desired shade, and thinning with additional solvent for spray application. The enamels were applied on undercoated steel panels which were exposed to Florida sunshine on a 45° S. fence.

In grading the exposed panels for chalking and fading, an arbitrarily selected numerical scale was adopted, running from 0 to 18, "0" representing no fading and "18", very extreme fading. A difference of one point on the scale is material.

Absolute reflectance or brightness

Reflectance is the ratio of light reflection from the sample to be tested to light reflected from standard MgO under conditions of equal and essentially diffuse illumination, and as viewed from a direction normal to the surface of the sample. The spectral reflection characteristics of the pigments of the instant invention have been measured by a so-called Hardy recording photoelectric spectrophotometer, a detailed description of which instrument and methods for operating the same are found in "Physical and Chemical Examination of Paints, Varnishes, Lacquers, Colors," by Gardner, 8th edition, January, 1937, pp. 135-136; Journal of Optical Society of America, vol. 22, pp. 305-311, September, 1935, and vol. 23, p. 359 (1933).

The apparatus is so constructed that the light reflected from the surface of a solid material may be the basis of a curve drawn at the time of the measurement. Mono-chromatic light is used and readings are possible throughout the visible spectrum with light ranging from 400-700 millimicrons. By use of the 1931 C. I. E. Standard and Coordinate System, curve values for dominant wave lengths in millimicrons, per cent excitation purity, per cent brightness, the tri-chromatic coefficients and tri-stimulus values are calculated.

The samples were prepared for test by pressing the pigments into a pillbox holder against a glass plate to obtain a smooth, homogeneous surface, and the surface of the pressed powders examined directly in the Hardy P. E. recording spectrophotometer.

The surface of the pressed powder sample is illuminated normally by monochromatic light and the amount of light reflected diffusely, relative to the amount of the same light reflected in the same manner from a surface of magnesium oxide, is a measure of the percent reflectance of the sample at the wavelength used. The sample is examined at all wavelengths, in turn, throughout the visible spectrum, and the values of reflectance at each wavelength form a continuous curve, referred to as a spectrophotometric curve.

By use of the 1931 C. I. E. Standard Observer and Coordinate System and E. I. E. illuminant "C", values may be calculated from the spectrophotometric curve that describe the sample in much the same manner as it would appear visually to a normal observer, where illuminated by north sky light. The values of dominant wavelength (in millimicrons), per cent excitation purity, and per cent brightness have been so calculated from the curves of the samples, and these values correspond approximately to the terms hue (whether red, yellow, green, or blue), saturation (how blue, how red, etc.), and brilliance (whether a "dark" or a "light" shade), respectively.

Color

Color is the apparent brightness and tint of the pigment in an oil paste, as measured relative to a standard similarly prepared as is expressed in units on an arbitrary scale.

The procedure followed in testing the pigments of the instant invention is essentially that described by J. E. Booge and H. E. Eastlack in the Paint, Oil and Chemical Review, April 9, 1924. Briefly, this comprises mulling the pigment with acid refined linseed oil of acid number 12.5 to form a thick paste. The sample to be tested and the standard are placed beside each other on a microscopic slide 2"x3" in daubs about 1½"x1". The daubs should be in sharp contact without air bubbles in the contact line and should be sufficiently thick to cut off all transmitted light. The pastes are then graded under north sky light for difference in appearance. The minimum perceptible difference in brightness is called one point of color. The sample is graded in full points from the standard. Differences in tint are important. In the case of white pigments a yellowish cast of the sample is penalized in the grading to the extent of one or more points, depending on whether it is barely perceptible or clearly evident. On the other hand, a bluish cast relative to the neutral standard is considered desirable and consequently modifies the grading upward.

The scale is selected in an arbitrary manner and values are given to several standard pigments within the useful range, a difference of one point being material. Salable pigments should rate above 8 or higher.

Tinting strength

Tinting strength is a measure of the effectiveness of a white pigment in covering up the tint of a colored pigment mixed with it. The property is relative in nature and results are obtained in comparison with another pigment used as a standard. These results depend on the standard for magnitude, but are independent of the standard for relative order.

The tinting strengths of the pigments produced in accordance with the instant invention were determined substantially in accordance with the method described by J. E. Booge and H. E. Eastlack in the Paint, Oil and Chemical Review, April 16, 1924. Briefly, pastes are prepared by mulling together the white pigment, ultramarine blue, and acid refined linseed oil of 12.5 acid number. The proportions used in determining the tinting strength of pigments of the invention were 3.0 grams of the titanium pigment, 1.0 gram of ultramarine blue and 1.5 cc. of oil. These ingredients were made into a paste with a spatula and mulled for 3 minutes with a 15 pound weighted muller.

Standards are prepared in the same manner except for the amount of blue which is increased or decreased proportionally as it is desired to prepare standards for lower or higher strength. The proportion of blue used in the standard paste to give any desired strength is inversely proportional to that strength. Thus, one standard is called arbitrarily 150 which corresponds to 1.0 grams of blue in the paste. The required amount for 140 strength is $$\frac{150}{140} \times 1.0 \text{ or } 1.0714 \text{ grams}$$

A standard titanium oxide pigment which was arbitrarily graded 150 was used. This pigment was of commercial quality similar to that regularly supplied to the paint industry at the present time.

The samples are graded by placing the sample paste on a microscope slide between standards of higher and lower strength (that is less or more deeply tinted) and not more than 5% apart in strength.

Hiding power

Hiding power may be defined qualitatively as that property of a paint which enables it to obliterate beyond recognition any background over which it is spread. Mathematically, it is usually expressed as square feet per gallon of paint.

The hiding power of a pigment may be calculated from the hiding power of the paint in which it is compounded by a simple calculation involving the figure for the weight of pigment per gallon of paint. It is expressed as the area in square centimeters covered per gram of pigment.

The equipment and methods used in determining hiding power values were substantially those described in Gardner's "Physical and Chemical Examination of Paints, Varnishes, Lacquers, Colors" (January 1937 edition) page 45, et seq., entitled "Krebs dry film incomplete hiding power."

Oil absorption

Oil absorption is the amount of oil in grams required to wet 100 grams of pigment.

The method of testing employed in determining oil absorption values is described in Gardner's Physical and Chemical Examination of Paints, Varnishes, Lacquers and Colors, 1933 edition, pp. 475-7.

A 5-gram sample is used, acid-refined linseed oil of 12.5 acid number is added slowly from a burette and worked into the pigment with a spatula on a smooth glass plate. The addition of oil is continued, a drop or two at a time, until the pigment can be collected in one coherent mass adhering to the spatula, but not wetting the glass. The amount of oil used to wet the pigment is read from the burette.

Particle size

Particle size, as employed herein, refers to the magnitude of the discrete particles making up the pigment. It is expressed usually as the arithmetical mean average diameter of the pigment particles.

The method employed for determining the same is outlined in the Proceedings of the Thirty-sixth Annual Meeting of the American Society for Testing Materials, vol. 33, pp. 989–995 (1933). This comprises a photomicrographic method and reproducibility within satisfactory limits was found possible. Briefly, the pigments are dispersed in Canada balsam in the preparation of the slides. Photomicrographs are made at 1500X magnification, using a 90X apochromat objective and a 12.5X Huygenian ocular. A carbon arc with a Wratten #49 filter is employed as a source of light. Photographic prints are made with enlargement of 3⅓ times, giving an overall magnification of 5000 diameters.

For each pigment, at least 250 particles were measured in each of three representative fields. The horizontal diameters splitting the particles in half were measured in each case. The average diameters $d_1$ (arithmetical mean average) were then calculated, using the relationships $$d_1 = \frac{\text{end}}{\text{en}}$$

en representing the number of particles of any given mass.

Crystal structure

As indicated, titanium dioxide occurs in three different crystalline forms, anatase, brookite, and rutile. Each crystal form has its characteristic X-ray diffraction pattern and present day technique is sufficiently developed to give semi-quantitative percentage values for mixtures of the modifications.

In determining the crystal structure of the pigments of the instant invention, the finely-divided pigment is placed in the path of a beam of X-rays and a diffraction pattern is obtained on a negative in the customary manner. The developed negatives are then compared to known standard patterns. Two or more patterns may be present on one negative and each can be identified in this comparison. By using the proper time of exposure, the contrast of the lines in the two patterns give a measure of the concentration of each component in the mixture. This estimation is made more accurate by preparing negatives of pigment mixtures of known concentrations of anatase, rutile, etc. and using these in the comparisons.

Having explained in some detail the terminology employed to describe the various pigmentary properties which the novel pigments of the present invention will characteristically exhibit, a description of one practical adaptation of said invention will now be undertaken.

In one preferred embodiment, and to obtain optimum benefits hereunder, to an aqueous slurry of titanium dioxide in substantially anatase crystalline state and previously calcined to develop such desirable pigmentary properties as satisfactory tinting strength, hiding power, etc., about .1% to 2% of zinc oxide, based on the weight of the pigment under treatment, is added. Alternatively, and if preferred, a sufficient quantity of a solution of zinc sulphate adapted to decompose under subsequent heat treatment and provide such amounts of zinc oxide may be utilized. Upon suitable addition of the requisite amount of zinc compound to the pigment slurry, the whole mass is subjected to vigorous agitation to effect thorough mixing and uniform incorporation of the zinc compound throughout the pigment particles. The slurry is then filtered to a relatively dry condition, this dewatering operation providing a $TiO_2$ pigment throughout which the zinc compound remains in even and intimately distributed contact. The resultant product or mixture is then subjected to calcination at temperatures ranging from about 850–950° C. in a rotary type of kiln calciner for a period of time sufficient to convert the anatase $TiO_2$ pigment to substantially complete rutile modification and chemically combine therewith, due to zinc presence, relatively small and minor quantities of zinc ortho titanate crystals. The calcined, recovered product is then finished by wet milling the same in a convenient grinding apparatus, such as a ball mill, filtered, dried and pulverized to break up lumps formed during drying. The pigment product is then ready for direct incorporation in all types of paint and coating compositions.

In order to more clearly describe the invention, the ensuing examples are furnished, each of which is only illustrative in character and no wise in limitation of its underlying concepts:

Example I

To 100 parts of uncalcined anatase titanium dioxide in the form of a thick viscous slurry was added 1% of zinc oxide, and after thorough agitation to effect intimate mixing, the mixture was evaporated to dryness. The resultant product was thereafter calcined in a rotary kiln for a period of 30 minutes at approximately 1000° C. The product was then wet ground, filtered and dried. When tested in accordance with methods already outlined, the resultant pigment was determined to possess the following characteristics: Its $TiO_2$ content had been converted to substantially 100% rutile; its particle size average ($d_1$) was .61 micron diameter; its tinting strength value 170; its oil absorption value 16.1; and its color value 12.6. When formulated in paints and automotive finishes, it exhibited excellent hiding power and durability characteristics.

Example II 100 kg. of previously calcined anatase titanium dioxide was suspended in water to form a mobile slurry at a concentration of 250 grams of $TiO_2$ per liter of suspension. To this suspension was added a solution containing 1.98 kg. of $ZnSO_4$ dissolved in water (equivalent to 1 kg. of zinc oxide) and the aqueous mixture agitated to insure complete mixing. The slurry was evaporated to dryness and calcined for a period of 30 minutes at a temperature of about 950° C. in a rotary kiln. The calcined product was wet ground, filtered, dried and pulverized, and determined to have the following characteristics: Its TiO₂ content had been converted to substantially 90% rutile; its particle size average ($d_1$) was .45 micron diameter; its tinting strength value 166; its oil absorption value 17.8; and its color value 13.2. When formulated in paints and automotive finishes, it exhibited excellent hiding power and durability characteristics.

Example III

To 100 parts of uncalcined anatase TiO₂ in the form of a thick viscous slurry was added 4 parts of zinc sulfate (equivalent to 2% zinc oxide). The resultant product was thereafter calcined in a rotary kiln for a period of 30 minutes at approximately 925° C. The product was then wet ground, filtered and dried. When tested in accordance with methods already outlined, the resultant pigment was determined to possess the following characteristics: Its TiO₂ content had been converted to substantially 100% rutile; its particle size average ($d_1$) was .40 micron diameter; its tinting strength value 172; its oil absorption value 18.6; and its color value 14.5. When formulated in paints and automotive finishes, it exhibited excellent hiding power and durability characteristics.

Example IV

To 100 parts of uncalcined anatase TiO₂ in the form of a thick viscous slurry was added 4 parts of zinc sulfate (equivalent to 2% zinc oxide). The resultant product was thereafter calcined in a rotary kiln for a period of 30 minutes at approximately 1000° C. The product was then wet ground, filtered and dried. When tested in accordance with methods already outlined, the resultant pigment was determined to possess the following characteristics: Its TiO₂ content had been converted to substantially 100% rutile; its particle size average ($d_1$) was .43 micron diameter; its tinting strength value 152; its oil absorption value 16; and its color value 13.5. When formulated in paints and automotive finishes, it exhibited excellent hiding power and durability characteristics.

Example V

An uncalcined, hydrated titanium dioxide precipitate containing 100 kg. of TiO₂ was suspended in water to form a mobile slurry. To this suspension was added a solution containing 1.98 kg. of zinc sulfate dissolved in water (equivalent to 1 kg. of zinc oxide). The slurry was agitated to effect intimate mixing, then dried and the mixture obtained calcined in a rotary kiln for 30 minutes at a temperature of 935° C. The calcined product was finished by wet grinding, filtering, drying and pulverizing. When tested in accordance with methods already outlined, the resultant pigment was determined to possess the following characteristics: Its TiO₂ content had been converted to substantially 85% rutile; its particle size average ($d_1$) was .5 micron diameter; its tinting strength value 166; its oil absorption value 17.9; and its color value 13.2. When formulated in paints and automotive finishes, it exhibited excellent hiding power and durability characteristics.

Example VI 100 kg. of calcined, anatase titanium dioxide are suspended in water, and with this suspension is incorporated a solution containing 9.9 kg. of ZnSO₄ dissolved in water (equivalent to 5% ZnO). The slurry is dried and the mixture is calcined for 60 minutes at a temperature of 850° C. The calcined product is finished by wet grinding, filtering, drying, and pulverizing. When tested in accordance with methods already outlined, the resultant pigment was determined to possess the following characteristics: Its TiO₂ content had been converted to substantially 95% rutile; its particle size average ($d_1$) was .7 micron diameter; its tinting strength value 166; its oil absorption value 18; and its color value 12.1. When formulated in paints and automotive finishes, it exhibited excellent hiding power and durability characteristics.

Example VII

An uncalcined, hydrated titanium dioxide precipitate containing 100 kg. of TiO₂ is suspended in water, and with this is incorporated 9.9 kg. of ZnSO₄ dissolved in water (equivalent to 5% ZnO). The slurry is dried and the mixture is calcined for 60 minutes at a temperature of 850° C. The calcined product is finished by wet grinding, filtering, drying, and pulverizing. When tested in accordance with methods already outlined, the resultant pigment was determined to possess the following characteristics: Its TiO₂ content had been converted to substantially 95% rutile; its particle size average ($d_1$) was .8 micron diameter; its tinting strength value 165; its oil absorption value 18; and its color value 12.2. When formulated in paints and automotive finishes, it exhibited excellent hiding power and durability characteristics.

Although specific temperatures of calcination and specific types and amounts of zinc compounds have been mentioned as utilizable in the invention, it will be understood these are not to be taken as critical. Generally, calcination or recalcination temperatures of the order of from about 600–1100° C. may be employed in the invention, a preferred and particularly desirable range being from about 850 to 1050° C. The calcination temperature employed will be found to depend somewhat upon the amount and type of zinc compound utilized, as well as upon the particular color value desired in the pigment product. As the accompanying curves illustrate, temperatures of calcination influence the color or brightness of the pigment product. Thus, as shown by said curves, the color values check the brightness values, as measured by the Hardy spectrophotometer and indicate that as calcination temperatures increase, pigment color values decrease. Accordingly, in some instances it may be desirable to employ relatively low calcination temperatures, in order to minimize or avoid color losses. While such lowering in color by reason of the use of relatively high calcination temperatures is generally undesirable, it will be found that starting with a pigment having a brightness or color of about 95% or higher in the invention, a color value of 90% or higher can be easily obtained. Thus, a pigment product as satisfactorily white or bright as such extensively used pigments as basic carbonate, white lead, and leaded zinc oxide can be produced, and any color loss which may arise is tolerable, since it is more than offset by the improved fading and chalking resistance characteristics which the pigment products exhibit when employed in exterior paints and automotive finishes. The following data illustrates more particularly the brightness or color values which representative pigments of this invention exhibit when subjected to varying conditions of calcination, and in accordance with the invention. These data effectively demonstrate the satisfactory color values which pigments of the instant invention exhibit, especially when it is considered that a high-grade commercial anatase titanium dioxide pigment exhibits a brightness value of 97.7, when tested in accordance with methods already outlined:

| Pigment | Brightness prior to treatment | ZnO | Temp. calcn. | Brightness after treatment |
|---|---|---|---|---|
| | | Percent | °C. | |
| 1 | 97.7 | 1 | 900 | 97.3 |
| 2 | 97.7 | 1 | 926 | 96.4 |
| 3 | 97.7 | 1 | 950 | 95.5 |
| 4 | 97.7 | 1 | 974 | 95.8 |
| 5 | 97.7 | 1 | 1003 | 95.7 |
| 6 | 97.7 | 1 | 1023 | 95.5 |
| 7 | 95.0 | .1 | 900 | 92.7 |
| 8 | 97.7 | 2 | 895 | 97.1 |
| 9 | 97.7 | 2 | 950 | 96.6 |

As stated, the type and amount of zinc compound such as the preferred zinc oxide compound, utilizable in the invention, is subject to variance. In general, I prefer to employ relatively small amounts of non-volatile zinc compounds, of the order of, say, from about .1% to 2% or up to 10%, based on the weight of the pigment. Use of such amounts will result in the final pigment product containing from .15 to 3% and up to 15% of zinc titanate. While these small amounts are preferable, larger amounts, but relatively minor in proportion to the titanium dioxide, and as high as, say, 25 or 30%, based on the weight of the pigment, may be employed, if desired. Zinc compounds preferably adapted for use in the invention include those which are non-volatile under prevailing calcination or recalcination conditions, or which, under such conditions, decompose to form zinc oxide as a reactant. Among specific types of such non-volatile zinc compounds may be mentioned the sulfate, the nitrate, the acetate, the hydroxide, the oxalate, the peroxide, the sulfide, the oxysulfide, the carbonate, or the thiosulfate. Where the zinc compound employed is added as a dissolved salt to an aqueous TiO$_2$ suspension, and filtration is had as a means of dewatering, necessarily some of the dissolved salt will be lost in the filtrate. Obviously, this can be taken into consideration and accounted for at the time of salt addition. If desired, this loss may be obviated by resorting to neutralization with a base, such as ammonium hydroxide, to precipitate the zinc onto the pigment particles. Any soluble salt formed during such neutralization can then be washed out and recovered.

The method of adding or incorporating the zinc compound in the pigment prior to heat treatment is also subject to variance. While preferably intimate mixing of the zinc compound with the titanium compound is effected by milling or agitating aqueous, thick slurries of the pigment and solution of zinc sulfate, dry mixing of the reactive ingredients may also be had, provided, however, care is taken to effect intimate and uniform dispersion and contact of the zinc compound with the titanium dioxide particles prior to calcination treatment.

While, in the preferred adaptation of the invention, calcined or uncalcined anatase TiO$_2$ has been employed as an exemplifying reactant, use of precipitated or converted rutile TiO$_2$ as a reactant with the zinc compounds of the present invention is also contemplated and in order to effect like desired durability improvements in respect to chalking and fading resistance in such rutile pigments. Pigment durability tests already had indicated maximum and optimum pigment stability arises when the titanium dioxide which has been combined with minor quantities of zinc titanate crystals is in substantially 100% rutile state; and, furthermore, that such stability is particularly notable and exceptional when such rutile titanium dioxide has been converted from its anatase modification. Where conversion to rutile has been partially effected, the fading and chalking resistance characteristics which the zinc-treated pigment will exhibit will be found to be more or less proportional to the amount of rutile present therein, e. g., the greater the amount of the more dense rutile crystal present, the more effective will be the durability characteristics of the pigment. For optimum benefits under the invention, it will be found desirable to resort to calcination temperatures which will effect from about 90 to 100%, and preferably in excess of 95%, rutile conversions. In effecting such conversions, it will be found desirable and preferable to employ calcination temperatures which are not in excess of substantially 25° C. to 50° C. above the point at which such complete rutile conversion is effected. As has been indicated, these effective calcination temperatures vary with the zinc concentration, and furthermore, relatively high calcination temperatures induce an undesired sacrifice in tinting strength and pigment color values. Therefore, the limiting calcination temperature figures just given provide a useful guide for adopting optimum calcination temperatures in the invention.

Where anatase titanium dioxide is employed as a starting material in the invention and initially subjected to calcination to first develop desired pigmentary values, such preliminary calcination is preferably effected under such conditions as will inhibit conversion of the anatase to rutile. For this purpose, suitable conversion-inhibiting agents such as disclosed and claimed in my co-pending, concurrently-filed application Serial No. 215,218, and particularly the soluble potassium sulfate or carbonate salts disclosed in U. S. Patent 1,892,693 may be usefully employed. After calcination, pigment-developed anatase titanium dioxide may be water-washed to extract the soluble alkali salts therefrom and then recalcined but in the presence of the zinc compounds contemplated herein, whereby conversion of the titanium dioxide to rutile crystalline form and combination therewith of relatively minor quantities of zinc titanate crystals becomes effected.

The use of the zinc compounds of my invention during titanium dioxide calcination or recalcination will be found distinctly advantageous and unexpectedly and desirably influence the properties which the ultimate pigment will exhibit, especially its uniformity, texture, particle size, chalking and fading resistance characteristics. The presence of minor quantities of zinc oxide during calcination, and particularly during conversion of the anatase to rutile, exerts a uniform increase in pigment particle size, this arising, apparently, by reason of the two-fold change occuring, i. e., transformation of anatase to rutile and concurrent combination therewith of zinc ortho-titanate crystals. The temperature at which this occurs varies, but is usually in excess of 800° C., and depends upon the zinc oxide concentration present. Generally, however, the higher the zinc oxide concentration the lower will be the effective conversion temperature. For instance, as the accompanying Figure 1 demonstrates, when using about 2% zinc oxide, optimum tinting strength and conversion to rutile becomes effected at a temperature of about 920° C., whereas when using about 1%, a temperature of about 940° C. is required. Thus, a convenient method for controlling titanium dioxide pigment particle sizes by correlating calcination temperatures with amounts of zinc oxide utilized is afforded.

The influence which the use of small amounts of zinc compounds exerts upon the particle size of the titanium dioxide obtained in the invention is more clearly shown by the following table, wherein direct comparison between pigments of the instant invention with standard anatase titanium dioxide and precipitated rutile is had. In each instance, $d_1$ represents average particle size diameters:

| No. | ZnO | Calc. temp. | Rutile | $d_1$ |
|---|---|---|---|---|
| | Percent | °C. | Percent | |
| 1 | .7 | 1000 | 70 | .36 |
| 2 | 1 | 975 | 97 | .39 |
| 3 | 1 | 1000 | 100 | .40 |
| 4 | 2 | 925 | 100 | .40 |
| 5 | 2 | 1000 | 100 | .43 |
| 6 | 1 | 1000 | 100 | .45 |
| 7 | 1 | 1000 | 100 | .61 |
| Standard anatase TiO₂ | | | 0 | .29 |
| Precipitated rutile TiO₂ | | | 100 | .26 |

It will thus be seen that the products obtained in accordance with this invention will comprise a composite pigment consisting substantially of rutile titanium dioxide (determined in accordance with the X-ray diffraction pattern tests hereinbefore set out) together with minor quantities of combined zinc titanate crystals in the form of zinc ortho-titanate ($Zn_2TiO_4$). The zinc titanate content of said pigment will range, preferably, from about .15% to about 3% and to as high as about 15%. When these pigments are tested in accordance with procedures already outlined, they will be found to be relatively large but substantially uniform in average ($d_1$) particle size diameter, but within the desirable range of from about .3 to about 2.0 microns. Usually, less than 40% of the particles will average below about .3 microns, while over 95% thereof will not exceed an average of substantially 2.0 microns. Furthermore, more than 40% will range from about .40 to .80 average micron diameter, well within the range of titanium pigment particle size most desirably useful for exterior tinted paints and automotive finishes. When sizes of these pigments are compared with the chalking and fading prior rutile and anatase TiO₂ pigments, the rutile by corresponding determination exhibiting an average ($d_1$) diameter ranging from .20 to .30 microns, and the anatase having more than 70% of its particles less than .3 micron, with 90% thereof not exceeding .4 micron and none exceeding .8 micron, the particle size distinction which the pigments of the present invention present is clearly evident.

It will be found that the pigments of this invention will exhibit superior and greatly improved hiding power values over prior titanium dioxide pigments, and especially over 100% zinc titanate pigments which are very low, not only in hiding power but tinting strength as well. This increase in hiding power and tinting strength is very advantageous because one is permitted to formulate the paint with satisfactory one-coat hiding power or, alternatively, to incorporate in paints containing the present pigments more inert extenders of low cost, to thereby reduce the cost of such paint without incurring any sacrifice in hiding power or durability.

Again, as the accompanying figures illustrate, these novel pigments possess other valuable pigmentary characteristics, such as improved tinting strength, oil absorption and satisfactory color or brightness. For instance, when the pigments are produced under preferred conditions, and depending upon temperatures of calcination and zinc oxide concentrations, they will be found to exhibit values in tinting strength ranging from about 140 to about 170. This, considering that the lowest acceptable limit for a commercial, exceedingly high grade pigment is 120, is highly demonstrative of the fact that these pigments are manifestly superior over prior pigments in this respect alone.

The pigments will exhibit desirable oil absorption values which will range from about 16 to about 20, these values decreasing as the calcination temperature increases. Thus, it is possible to obtain a decrease of 30% or more, if desired, and, as the accompanying graphs show, a decrease of only about 17% is usually effected when conversion of the titanium oxide to rutile occurs. For commercial purposes, an oil absorption of 12 or less is not acceptable, while a value of 15 or higher is very desirable, and the improvement which these pigments afford in this respect is at once apparent.

As already indicated, pigment color is somewhat influenced by the temperatures of calcination. However, a satisfactorily white, bright pigment may be obtained herein, even when relatively high calcination temperatures are resorted to. Thus, starting with a pigment having a brightness or color of about 95%, a final pigment color of about 90% or higher is easily obtainable, and thus a pigment results which is adapted to a wide and general commercial usage. As the accompanying graphs show, the pigment color values obtained check the brightness values, as measured by the Hardy spectrophotometer. Although some slight loss in color arises, this is not at all undesirable, since it is more than compensated for by the improved chalking and fading resistance properties which these pigments exhibit when employed in exterior coating formulations.

Durability tests in exterior house paints and automotive finishes to determine the fading and chalking resistance characteristics of these novel pigments in such formulations as against prior titanium pigments, have been undertaken. It is in these fields that the white titanium oxides from prior processes have shown their inability to displace other prime pigments, in spite of their superior hiding power. Excessive chalking of white automotive paints or finishes made with titanium oxide has prevented its adoption in this field, and excessive fading of tints has prevented its widespread adoption in the tinted exterior paint field.

In one series of test exposures on comparative durability, a widely used outside house paint formulation such as that already referred to was selected, while in another series an automotive finish consisting of a polyhydric alcohol-polybasic acid resin formulation such as already described was employed. Suitable controls were used in every instance of test, consisting of prior TiO₂ pigments in standard paint and automotive finish formulations. The automotive finish standard contained 30% titanium dioxide and 70% of antimony oxide pigment, the latter, although much inferior in hiding power, being commonly used to impart chalk resistance to the titanium oxide. Also, a 100% zinc titanate pigment in a standard, equal hiding power formulation containing 60.1% of zinc titanate and 36.1 leaded zinc oxide with 3.3% of asbestine was used. The various panels employed in the comparative tests were exposed on vertical and 45° inclined Delaware fences facing south, and also on 45° south Florida fences, as already described. The Florida exposure is a greatly accelerated test by which one may determine the paint properties of a given pigment within a shortened period of time. These are almost always affirmed by the Delaware south vertical test, which is somewhat more representative of American weather conditions.

The following are representative results on fading and chalking from these tests, particularly in respect to outside house paints, after approximately 8½ months' exposure (the Florida exposure being naturally more advanced):

| Pigment | Gradings | | | |
|---|---|---|---|---|
| | Florida 45° S. | | Delaware SV | |
| | Gray | Buff | Gray | Buff |
| Prior art TiO₂ (anatase) | 15 | 18 | 15 | 15 |
| Prior art TiO₂ (rutile) | 15 | 15 | 15 | 15 |
| 100% zinc titanate | 18 | 18 | 18 | 18 |
| Rutile TiO₂ (1% ZO – 1000° C.) | 7 | 0 | 4 | 1 |

To more particularly illustrate the durability characteristics which the instant pigments exhibit, and especially the effect which the presence of rutile and zinc titanate has in the pigment, the following results are given, obtained as a result of Florida exposures for a period of three and one-half months in the described automotive finishes and house paint formulations:

(a) *Polyhydric alcohol-polybasic acid automotive finish*

| TiO₂ pigment | ZnO | Calc. temp. | Rutile | Chalking and fading |
|---|---|---|---|---|
| | Percent | °C. | Percent | |
| 1 | 1 | 850 | 0 | 18 |
| 2 | 2 | 850 | 0 | 18 |
| 3 | 1 | 875 | 0 | 13 |
| 4 | 2 | 875 | 0 | 13 |
| 5 | 1 | 900 | 10 | 4 |
| 6 | 2 | 900 | 10 | 3 |
| 7 | 1 | 925 | 75 | 0 |
| 8 | 2 | 925 | 75 | 0 |
| 9 | 1 | 950 | 90 | 0 |
| 10 | 2 | 950 | 90 | 0 |
| 11 | 1 | 975 | 98 | 0 |
| 12 | 2 | 975 | 98 | 0 |
| 13 | 1 | 1000 | 100 | 0 |
| 14 | 2 | 1000 | 100 | 0 |
| 15 | 3 | 1000 | 100 | 0 |
| 16 | 5 | 1000 | 100 | 0 |
| 17 | 10 | 1000 | 100 | 0 |
| 18 | 1 | 1025 | 100 | 0 |
| 19 | 2 | 1025 | 100 | 0 |
| 20 | 1 | 1050 | 100 | 0 |
| 21 | 2 | 1050 | 100 | 0 |
| Prior art (anatase) | | | 0 | 18 |

(b) *Exterior house paints*

| TiO₂ pigment | ZnO | Calc. temp. | Rutile | Chalking and fading |
|---|---|---|---|---|
| | Percent | °C. | Percent | |
| 1 | 1 | 850 | 0 | 12 |
| 2 | 2 | 850 | 0 | 12 |
| 3 | 1 | 875 | 0 | 12 |
| 4 | 2 | 875 | 0 | 11 |
| 5 | 1 | 900 | 10 | 9 |
| 6 | 2 | 900 | 10 | 4 |
| 7 | 1 | 925 | 75 | 5 |
| 8 | 2 | 925 | 75 | 2 |
| 9 | 1 | 950 | 90 | 3 |
| 10 | 2 | 950 | 90 | 1 |
| 11 | 1 | 975 | 98 | 1 |
| 12 | 2 | 975 | 98 | 2 |
| 13 | 1 | 1000 | 100 | 1 |
| 14 | 2 | 1000 | 100 | 1 |
| 15 | 1 | 1025 | 100 | 1 |
| 16 | 2 | 1025 | 100 | 0 |
| 17 | 1 | 1050 | 100 | 1 |
| 18 | 2 | 1050 | 100 | 0 |
| Prior art (anatase) | | | 0 | 18 |

The foregoing results on chalking and fading demonstrate the inherent superiority which pigments of this invention exhibit over prior titanium pigments. Thus, paints and automotive finishes made up from ordinary anatase and rutile titanium dioxide and admixed with other pigments and extenders or paints containing 100% titanate pigments, when exteriorally exposed, exhibit poor durability, i. e., pronounced and extreme fading and chalking within a very short period of time (less than two months), whereas the rutile titanium dioxide-zinc titanate pigments of my invention exhibit comparatively no fading or chalking, even after prolonged exposure and in excess of five months' time. This is effectively demonstrated by Figure 2 of the accompanying drawing, wherein curves are shown which represent the chalking characteristics which a series of panels coated with a standard automotive finish comprising a polyhydric alcohol-polybasic acid type of resin, and subjected to 45° south Florida exposures, exhibit after seven months' time. Thus, from said figure it will be seen when standard anatase titanium dioxide alone is employed in such formulations, extreme chalking is evident at the end of two months' time, while in instances where a mixture of titanium dioxide and antimony oxide is resorted to in such finishes, considerable chalking occurs at the end of seven months' time. In contrast to this, when these formulations contain the novel pigments of my invention, no chalking whatever is evident at the end of five months' time, and only very slight chalking occurs under these extreme conditions of exposure at the end of seven months' time. Thus, not only do my novel pigments exhibit a very decided improvement over anatase TiO₂ pigments, but they also evidence considerable improvement in chalking resistance characteristics over TiO₂-antimony oxide type mixtures of pigments. The novel pigments of my invention will be found to be particularly adaptable for use in these automotive finish formulations. As indicated, antimony oxide has been previously employed therein for the purpose of inhibiting the chalking tendencies of the TiO₂ pigment with which it is mixed. However, antimony oxide is very low in hiding power and the amount permissible for use therein ordinarily cannot exceed 50%. Consequently, full pigmentation is not afforded and the resultant coating composition will be lacking in desired hiding power characteristics. Use of the novel pigments of my invention in such automotive finishes affords full pigmentation with titanium dioxide and eliminates the necessity of resorting to a pigment which is relatively low and unsatisfactory in hiding power. In view of such permissible full pigmentation, the resulting coating film will be found suitable for one coat application as a finish and to exhibit satisfactory hiding or covering power.

Another advantage afforded by my invention lies in the fact that the calcined pigment of the present invention may be discharged from the calciner directly into a quenching or cooling liquid, such as water, and the customary method of cooling the calciner discharge in air prior to slurrying in water and grinding may be dispensed with. Due to the sintering action which takes place during calcination, titanium dioxide pigments upon discharge from the calciner are relatively hard and very difficult to grind. Quenching of the calcined $TiO_2$ in water is avoided because of the deleterious effect which sharp cooling has upon color, i. e., a blue rather than a white pigment results from prior anatase $TiO_2$ pigment treatments. This is thought to arise by reason of possible formation of $Ti_2O_3$ at the calcination temperature and due to the high temperature quench the equilibrium becomes arrested while appreciable amounts of $Ti_2O_3$ are present.

I have found that in my process a blue pigment is not produced when direct quenching of the hot pigment in water as it discharges from the calciner is resorted to. This important difference over the prior art is believed to arise in a large measure by reason of the presence of the zinc compound, although I have not definitely established this fact. Irrespective of the true explanation of the different behavior of the product of my invention, I am enabled to advantageously use this wet quenching procedure, and accordingly obtain a shattering action on the sintered particles by virtue of the direct discharge of the hot pigment into the cold water. This is a definite aid in grinding to effect fine pigment subdivision and, as stated, this has not been heretofore practical in titanium pigment production. By calcining the anatase $TiO_2$ in the presence of a small amount of a zinc compound such as zinc oxide and then quickly cooling by discharge of calcined pigment into water, I procure optimum results in my invention and am able to grind the otherwise hard pigment material to satisfactory fineness with a minimum of effort. The product is of satisfactory whiteness and brightness and does not possess the impaired color that accompanies similarly quenched prior art $TiO_2$ pigments.

In addition to its adaptability for use in all types of coating composition formulations, the pigment of my invention will be found to be especially suited for use in delustering rayon, whereby fade resistant dyed fabrics can be produced therefrom. This fading tendency which $TiO_2$ pigments exhibit in rayon is dissimilar from that existing in colored paints, for the reason that in the rayon the dye itself becomes bleached, while in paints, fading arises by reason of the accumulation of the titanium oxide particles on the surface of the paint film as a chalk, and as a consequence obscure the true paint color beneath. The superiority of my pigment for rayon use is adapted to all types of rayon, not only in viscose rayon, but also in acetate fibers and fabrics.

As stated, the improved titanium dioxide pigments of my invention will be adapted for many uses, and particularly in paint and coating composition formulations to be employed in outside exposures. In such formulations it will be desirable to add to the pigments suitable extenders, such as barium sulfate, fibrous talc, silica, ground barytes, whiting, etc., useful for their bulking value and thickening effect upon the paints or coating compositions.

It will be understood that the term "titanium dioxide" here and in the appended claims is used in its broadest sense and comprises not only titanium dioxide per se, but titanium dioxide suitably modified by either precipitated, blended or coalesced alkaline earth metal sulfate extenders, such as those of barium or calcium, or with other types of extenders, such as silica, magnesium silicate, or the silicates in general.

The product of my novel process will be found to contain a minor amount of zinc oxide chemically combined with titanium oxide. This combination takes place during the calcination operation and may readily be determined by an analytical method comprising an extraction with a dilute weak acid such as acetic acid (or ammoniacal ammonium salt solution) which dissolves free zinc oxide and water-soluble zinc salts but does not dissolve zinc when combined with titanium oxide. The presence of zinc in this solution is readily observed by addition of a sulfide solution or by adjustment to a pH of about 7. Zinc oxide not found by this test is regarded as being in chemical combination with titanium oxide.

I claim as my invention:

1. A process for preparing white pigments comprising heating a mixture of anatase titanium dioxide and a minor amount of zinc oxide at a temperature between above 840° C. and 1100° C., until by X-ray examination the presence of a substantial amount of rutile titanium dioxide can be detected.

2. A process for producing an improved pigment which comprises calcining pigmentary anatase titanium oxide in the presence of a small amount of zinc oxide at a temperature between above 840° C. and 1100° C., and continuing said calcination until substantial conversion of said anatase to rutile becomes effected and can be detected by X-ray examination.

3. As a new rutile pigmentary composition, a product substantially identical with that obtainable by heating a mixture of anatase titanium dioxide and a minor amount of zinc oxide at a temperature between above 840° C. and 1100° C., until by X-ray examination the presence of a substantial amount of rutile titanium dioxide can be detected.

4. A process for producing a stable, weather-resistant titanium dioxide pigment, comprising calcining titanium dioxide, at temperatures ranging from about 600 to about 1100° C., in the presence of a minor amount of a non-volatile zinc compound from the group consisting of an oxide or compound which yields an oxide during said calcination, until by X-ray examination the presence of a substantial amount of rutile titanium dioxide can be detected.

5. A process for producing a stable, weather-resistant titanium dioxide pigment comprising subjecting previously-calcined, pigment-developed anatase titanium dioxide to recalcination at temperatures ranging from about 600° C. to about 1100° C. in the presence of a small amount of a zinc compound from the group consisting of an oxide or compound which yields an oxide during said recalcination, and conducting said recalcination treatment for a period of time sufficient to substantially completely convert said anatase titanium dioxide to rutile.

6. A process for producing a relatively stable, weather-resistant titanium dioxide pigment comprising subjecting a mixture of pigment-developed anatase titanium dioxide and from about .1% to 10% of zinc oxide, based on the TiO₂ present, to calcination at temperatures ranging from about 600 to about 1100° C., and conducting said calcination treatment for a period of time sufficient to substantially completely convert said anatase titanium dioxide to rutile.

7. A process for producing a relatively stable, weather-resistant TiO₂ pigment, comprising subjecting a mixture of previously-calcined, pigment-developed anatase TiO₂ and from about .1% to 10% of zinc oxide, based on the TiO₂ present, to calcination at temperatures ranging from about 850 to 1050° C., and conducting said calcination treatment for a period of time sufficient to effect from substantially 90 to 100% conversion of the anatase TiO₂ to rutile.

8. A process for producing a stable, weather-resistant TiO₂ pigment comprising subjecting previously-calcined, pigment-developed anatase TiO₂ to recalcination at temperatures ranging from about 850 to about 1050° C. in the presence of from about .1% to 2% of zinc oxide, based on the TiO₂ present, and continuing said recalcination treatment for a period of time sufficient to substantially completely convert said anatase TiO₂ to rutile.

9. A process for producing a stable, weather-resistant TiO₂ pigment comprising subjecting a mixture of previously-calcined, pigment-developed anatase TiO₂ and from about .1% to 2% of zinc sulfate, based on the TiO₂ present, to recalcination at temperatures ranging from about 850 to about 1050° C., and continuing said recalcination treatment for a period of time sufficient to substantially completely convert said anatase TiO₂ to rutile.

10. A process for producing a stable, weather-resistant TiO₂ pigment comprising subjecting a mixture of previously-calcined, pigment-developed anatase TiO₂ and from about .1% to 2% of zinc nitrate, based on the TiO₂ present, to recalcination at temperatures ranging from about 850 to about 1050° C., and continuing said recalcination treatment for a period of time sufficient to substantially completely convert said anatase TiO₂ to rutile.

11. A process for producing a stable, weather-resistant titanium dioxide pigment, comprising initially calcining anatase titanium dioxide at a temperature ranging from about 600 to 1100° C. in the presence of a water soluble alkali metal salt, thereafter, in the substantial absence of said alkali metal compound, recalcining the titanium dioxide product at a temperature ranging from about 600 to 1100° C. in the presence of a small amount of a zinc compound from the group consisting of an oxide or zinc compound which yields oxide under the recalcination conditions, and continuing said recalcination treatment for a period of time sufficient to substantially completely convert said anatase titanium dioxide to rutile.

12. A process for producing a substantially stable, weather-resistant titanium dioxide pigment comprising initially calcining anatase titanium dioxide at a temperature ranging from about 600 to 1100° C. in the presence of a soluble alkali metal salt compound adapted to inhibit conversion of the anatase to rutile during said initial calcination, thereafter, but in the substantial absence of said alkali metal salt, recalcining the titanium oxide product at a temperature ranging from about 600 to 1100° C. in the presence of from about .1% to 10% of a zinc compound of from the group consisting of an oxide or compound of zinc which yields an oxide under the conditions prevailing during said recalcination, and continuing said recalcination treatment for a period of time sufficient to substantially completely convert said anatase titanium dioxide to rutile.

13. A process for producing a relatively stable, weather-resistant TiO₂ pigment, comprising initially calcining anatase TiO₂ at a temperature ranging from about 850 to about 1050° C. in the presence of potassium sulfate, whereby said anatase becomes inhibited from converting to rutile during said initial calcination, thereafter recalcining said anatase TiO₂ in the substantial absence of said potassium sulfate and in the presence of from about .1% to 2% of zinc oxide, based on the TiO₂, and conducting said recalcination treatment for a period of time sufficient to effect substantially 90 to 100% conversion of the anatase TiO₂ to rutile.

14. As a new rutile pigmentary composition, a product substantially identical with that obtainable by heating a mixture of anatase titanium dioxide and a minor amount of a non-volatile zinc compound from the group consisting of an oxide or compound which yields an oxide during heating at a temperature between about 600 to 1100° C., until by X-ray examination the presence of a substantial amount of rutile titanium dioxide can be detected.

15. As a new rutile pigmentary composition, a product substantially identical with that obtainable by heating a slurry mixture of previously-calcined, pigment-developed anatase TiO₂ and from about .1% to about 10% of a zinc compound from the group consisting of an oxide or compound which yields an oxide during heating at a temperature ranging from about 600 to 1100° C., until from about 90 to 100% conversion of the anatase to rutile becomes effected, as detected by X-ray examination.

16. As a new rutile pigmentary composition, a product substantially identical with that obtainable by heating a mixture of pigment-developed anatase TiO₂ and from about .1% to 10% of zinc oxide, based on said TiO₂, at a temperature ranging from about 850 to about 1050° C. until by X-ray examination the presence of a substantial amount of rutile titanium dioxide can be detected.

17. As a new rutile pigmentary composition, a product substantially identical with that obtainable by heating a slurry mixture of previously-calcined, pigment-developed anatase titanium dioxide and from about .1 to about 2% of zinc oxide, based on the TiO₂, at a temperature between about 850 and about 1050° C., until from substantially 90 to 100% conversion of said anatase to rutile becomes effected and can be detected by X-ray examination.

JAMES ELIOT BOOGE.